US011707702B2

(12) United States Patent
Coombe et al.

(10) Patent No.: US 11,707,702 B2
(45) Date of Patent: Jul. 25, 2023

(54) SAND SEPARATION CONTROL SYSTEM AND METHOD

(71) Applicant: ENERCORP ENGINEERED SOLUTIONS INC., Calgary (CA)

(72) Inventors: Brent James William Coombe, Calgary (CA); Ryan Thomas Bowley, Calgary (CA); Nikolay Spiridonov, Magnolia, TX (US); Rory Nagge, Calgary (CA); Tien Nguyen, Calgary (CA)

(73) Assignee: ENERCORP ENGINEERED SOLUTIONS INC., Calgary (CA)

( * ) Notice: Subject to any disclaimer, the term of this patent is extended or adjusted under 35 U.S.C. 154(b) by 0 days.

(21) Appl. No.: 17/513,333

(22) Filed: Oct. 28, 2021

(65) Prior Publication Data

US 2022/0047970 A1   Feb. 17, 2022

Related U.S. Application Data

(63) Continuation of application No. 17/096,490, filed on Nov. 12, 2020, now Pat. No. 11,577,184.
(Continued)

(51) Int. Cl.
*B01D 21/30* (2006.01)
*B01D 21/26* (2006.01)
(Continued)

(52) U.S. Cl.
CPC ......... *B01D 21/302* (2013.01); *B01D 21/245* (2013.01); *B01D 21/267* (2013.01);
(Continued)

(58) Field of Classification Search
CPC .. B01D 21/302; B01D 21/245; B01D 21/267; E21B 43/35; E21B 43/267; G01F 23/0007; G01G 19/00; G01M 3/2876
See application file for complete search history.

(56) References Cited

U.S. PATENT DOCUMENTS

| | | | |
|---|---|---|---|
| 6,672,335 B1 | 1/2004 | Welborn | |
| 6,790,367 B2 * | 9/2004 | Schmigel | B01D 21/245 166/267 |
| 9,803,459 B1 * | 10/2017 | Leal | B01D 21/2405 |
| 2011/0056572 A1 * | 3/2011 | Flanders | F17D 5/00 137/487.5 |

(Continued)

OTHER PUBLICATIONS

Non-Final Office Action dated Jan. 25, 2022, U.S. Appl. No. 17/096,490, 24 pages.

*Primary Examiner* — Bradley R Spies
*Assistant Examiner* — Jeannie McDermott
(74) *Attorney, Agent, or Firm* — MH2 Technology Law Group LLP

(57) ABSTRACT

An automated sand separator discharge system includes a sand separator disposed downstream of a wellhead, an inlet conduit for transporting a process stream to the sand separator, a fluid outlet conduit for transporting a liquid and gas stream from the sand separator, a sand discharge conduit for removing sand from the sand separator, first, second, and third valves disposed along the sand discharge conduit, a first transducer connected between the first and second valves and operative to measure pressure in a portion of the sand discharge conduit and to produce a pressure reading, and a control panel operatively connected to the first, second, and third valves and the first transducer, the control panel being programmed to initiate and terminate discharge of sand from the sand separator, and to determine if the first and second valves are sealing completely when closed.

30 Claims, 8 Drawing Sheets

Related U.S. Application Data

(60) Provisional application No. 62/957,585, filed on Jan. 6, 2020.

(51) Int. Cl.

| | | |
|---|---|---|
| *B01D 21/24* | (2006.01) | |
| *G01F 23/00* | (2022.01) | |
| *G01M 3/28* | (2006.01) | |
| *E21B 43/34* | (2006.01) | |
| *E21B 43/267* | (2006.01) | |
| *G01G 19/00* | (2006.01) | |

(52) U.S. Cl.
CPC .......... *E21B 43/35* (2020.05); *G01F 23/0007* (2013.01); *G01G 19/00* (2013.01); *G01M 3/2876* (2013.01); *E21B 43/267* (2013.01)

(56) References Cited

U.S. PATENT DOCUMENTS

| | | | |
|---|---|---|---|
| 2012/0241217 A1* | 9/2012 | Davis | E21B 44/00 |
| | | | 175/26 |
| 2013/0228526 A1 | 9/2013 | McAfee et al. | |
| 2014/0345727 A1* | 11/2014 | Gilmore | E21B 21/01 |
| | | | 137/624.21 |
| 2016/0290889 A1* | 10/2016 | Hilpert | E21B 47/117 |
| 2016/0327447 A1* | 11/2016 | Hilpert | E21B 33/06 |
| 2017/0191350 A1* | 7/2017 | Johns | E21B 43/26 |
| 2019/0211662 A1 | 7/2019 | Elmer | |
| 2019/0294184 A1 | 9/2019 | Al Khunaizi et al. | |
| 2019/0353017 A1* | 11/2019 | Johns | E21B 43/26 |
| 2021/0077923 A1 | 3/2021 | Carlson et al. | |
| 2021/0252431 A1 | 8/2021 | Malone et al. | |
| 2021/0299594 A1 | 9/2021 | Pitcher | |
| 2021/0363029 A1* | 11/2021 | Johns | C02F 1/008 |

\* cited by examiner

SAND SEPARATION CONTROL SYSTEM AND METHOD

CROSS-REFERENCE TO RELATED APPLICATIONS

This application is a continuation of U.S. patent application Ser. No. 17/096,490, which was filed on Nov. 12, 2020 and claims priority to U.S. Provisional Patent Application having Ser. No. 62/957,585, which was filed on Jan. 6, 2020. Each of these priority application is incorporated herein by reference in its entirety.

BACKGROUND

Hydraulic fracturing is a well-treatment process in which preferential flowpaths for hydrocarbons are established in a subterranean rock formation. The flowpaths are established by pumping a fluid at high pressure into a well to initiate fractures in the rock formation. The fracturing fluid may be predominately water, but may also include solids, such as sand or ceramic proppants, which at least partially fill the fractures and keep the fractures open, maintaining the preferential flowpaths through the rock after the process is complete.

When oil, water, or other fluids are produced/recovered from the well, it may be desirable to remove sand or other solids from the fluid. A separator system may be used for this purpose, and may include one or more separation devices (e.g., cyclonic separators), filters, screens, tanks, etc. The separated solids may be stored in the tank, which is periodically emptied or "blown down," while the fluids may be further separated (e.g., to separate hydrocarbons from water). Recovered hydrocarbons may be stored or otherwise transported for sale, and recovered water may be stored or otherwise recirculated for use in the well.

In some cases, it may be desirable to determine the amount of solids separated from the fluid in the separator, and/or the rate at which solids accumulate in the tank. In order to do this, the solids from the separator may be run through a "sock" during blowdown operations, which may, catch the solids while allowing the fluid to flow through. The sock is then weighed, which reveals the amount of solids collected therein between blowdown operations. However, such a manual process exposes operations to worker-related delays and calls for the sock to be removed and weighed after each blowdown, which can be time and labor intensive. Moreover, the manual processes are not well-suited to managing blowdown operations in multi-separator and/or multi-well systems.

SUMMARY

Embodiments of the disclosure include an automated sand separator discharge system that includes a sand separator disposed downstream of a wellhead, an inlet conduit for transporting a process stream from the wellhead to the sand separator, a fluid outlet conduit for transporting a liquid and gas stream from the sand separator to further downstream processing, a sand discharge conduit for removing sand from the sand separator, a first valve and a second valve, the first and second valves disposed along the sand discharge conduit, a third valve positioned along the sand discharge conduit, a first transducer connected to the sand discharge conduit between the first and second valves and operative to measure pressure in a portion of the sand discharge conduit that is between the first and second valves and produce a pressure reading indicating the measured pressure, and a control panel operatively connected to the first, second, and third valves and the first transducer, the control panel being programmed to initiate and terminate discharge of sand from the sand separator, the control panel also being programmed to periodically perform seal integrity checks of the first and second valves to determine if the first and second valves are sealing completely when closed.

Embodiments of the disclosure also include a method of discharging sand from a sand separator. The method includes providing a sand separator discharge system, the sand separator discharge system including a sand separator disposed downstream of a wellhead, an inlet conduit for transporting a process stream from the wellhead to the sand separator, a fluid outlet conduit for transporting a liquid and gas stream from the sand separator to further downstream processing, a sand discharge conduit for removing sand from the sand separator, a first valve and a second valve, the first and second valves being disposed along the sand discharge conduit, a third valve positioned along the sand discharge conduit, a first transducer connected to the sand discharge conduit between the first and second valves and operative to measure pressure in the portion of the sand discharge conduit which is between the first and second valves and produce a pressure reading indicating the measured pressure, a control panel operatively connected to the first, second, and third valves and the first transducer, the control panel being operative to initiate the discharge of sand from the sand separator, through the use of the control panel, initiating discharge of sand from the sand separator and performing the following: open the first valve; open the second valve; open the third valve; and through the use of the control panel, terminating discharge of sand from the sand separator and performing the following: close the third valve; and close the first valve.

Embodiments of the disclosure also include a sand separator system that includes a sand separator coupled to a well and configured to receive sand and fluid therefrom, the sand separator being configured to separate at least some of the sand from the fluid, a sand discharge coupled to the sand separator and configured to receive the sand separated from the fluid in the sand separator, a first valve and a second valve that are coupled to the sand discharge, the second valve being downstream of the first valve, a pressure sensor configured to measure a pressure in the sand discharge between the first valve and the second valve, and a control panel coupled to the first valve, the second valve, and the pressure sensor. The control panel is configured to actuate the first and second valves each between an open position and a closed position, and the control panel is configured to detect integrity of the first and second valves based in part on the pressure measured by the pressure sensor.

BRIEF DESCRIPTION OF THE DRAWINGS

The present disclosure may best be understood by referring to the following description and the accompanying drawings that are used to illustrate embodiments of the invention. In the drawings.

DETAILED DESCRIPTION

Figure 1:
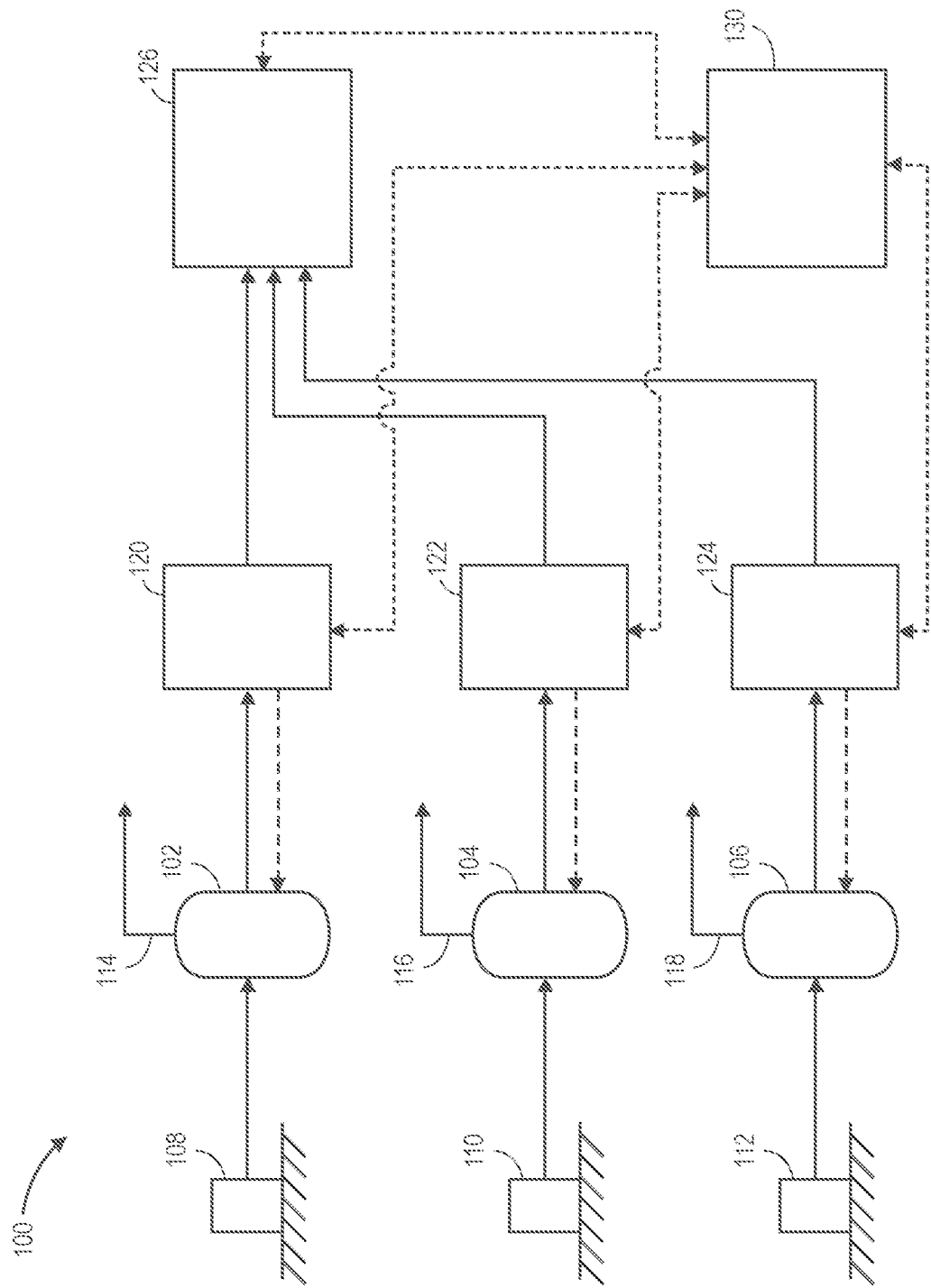
FIG. 1 illustrates a schematic view of a sand separation system, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a schematic view of a sand separation system 100, according to an embodiment. The system 100 is described herein in terms of separating sand, but it will be appreciated that in some contexts, "sand" may refer to particulate matter of various types, including, for example, ceramic proppant and the like, which may be injected and recovered from a well. The system 100 may include one or more separators (three shown: 102, 104, 106), which may each be coupled to and configured to receive a mixture of sand and fluids from a well 108, 110, 112, respectively. In the illustrated embodiment, one separator 102-106 is provided for each individual well 108-112, but it will be appreciated that in other embodiments, a single separator 102-106 may receive fluid from two or more wells 108-112 and/or two or more separators 102-106 may receive fluid from a single well 108-112.

The separators 102-106 may be configured to separate at least a portion of the sand from the fluids produced from the wells 108-112. The separated fluid may be routed through an outlet 114, 116, 118 of each separator 102-106 and delivered, e.g., to a production separator or another device or location. The sand, along with some of the fluid, that is separated from the mixture, may be temporarily stored in the separator 102-106. For example, the separators 102-106 may each provide a hopper, or another type of pressurized tank, which may, during normal operation, fill with the sand as it is separated. Before the sand entirely fills the separator 102-106, it may be removed therefrom, i.e., a "blowdown" process is executed.

Accordingly, the system 100 may include one or more blowdown units (three are shown: 120, 122, 124). For example, one blowdown unit 120-124 may be provided for each separator 114-116; however, it will be appreciated that this one-to-one configuration is merely an example, and two or more blowdown units 120-124 could be used for a single separator 102-106 and/or a single one of the blowdown units 120-124 could be provided for two or more of the separators 102-106. As will be described in greater detail below, the blowdown units 120-124 may include, among other things, one or more valves that are actuatable to control blowdown of the separators 102-106 associated therewith. Further, as indicated by the dashed lines between the blowdown units 120-124 and the separators 102-106, the blowdown units 120-124 may be configured to communicate with the separators 102-104. For example, the separators 102-106 may be provided with various chokes and/or pressure transducers, which may provide electrical data and/or control signals to the blowdown unit 120-124.

When the blowdown units 120-124 initiate a blowdown procedure, one or more valves therein, which are in fluidic communication with the separators 102-106, are opened, allowing the sand (e.g., as a slurry of sand and fluid) to flow out of the separators 102-106, through the blowdown units 120-124, and into a sand disposal unit 126. In some embodiments, the sand disposal unit 126 may include a sand quantification feature, which may be configured to provide data representing an amount of sand that was stored in the separator 102-106 between blowdowns. For example, the sand disposal unit 126 may provide the sand quantification feature using load cells, e.g., as disclosed in U.S. Provisional Patent Application No. 62/930,175, which is incorporated herein by reference in its entirety. In other embodiments, such a sand quantification feature may be provided within the separator 102-106 itself. For example, the separators 102-106 may include load cells, such as the separators described in U.S. Provisional Patent Publication No. 2019/0388907, which is incorporated herein by reference in its entirety, to the extent not inconsistent with the disclosure herein. In another embodiment, the separators 102-106 may include other types of sensors that are able to detect an amount of sand that is in the separators 102-106, e.g., as described in U.S. patent application Ser. No. 16/711,561 and/or U.S. Provisional Patent Application No. 62/946,520, which are both incorporated by reference herein in their entirety, to the extent not inconsistent with the present disclosure.

The system 100 may also include a central controller (or "control system") 130, which may communicate at least with the blowdown units 120-124. The central controller 130 may also communicate with the sand disposal unit 126, e.g., in cases where the sand disposal unit 126 includes the sand quantification feature. The central controller 130 may be in communication with the blowdown units 120-124 via electric communication and/or the separators 102-106. For example, the central controller 130 may send signals to the blowdown units 120-124 commanding the blowdown units 120-124 to open individual valves thereof, e.g., to initiate or terminate a blowdown procedure, mitigate valve malfunctioning, shutoff blowdown capabilities, etc. Further, the central controller 130 may be configured to receive feedback signals from the blowdown units 120-124, e.g., pressure and/or flow measurements at specific locations therein and/or in the separators 102-106. Additionally, the central controller 130 may include hardware enabling communication with local and/or remote operators, e.g., through a human-machine interface. For example, the central controller 130 may include output devices such as a computer terminal, an antenna for wireless communication, a web portal connection, etc. Additional details relevant to operation of the central controller 130, according to various embodiments, are discussed below.

Figure 2:
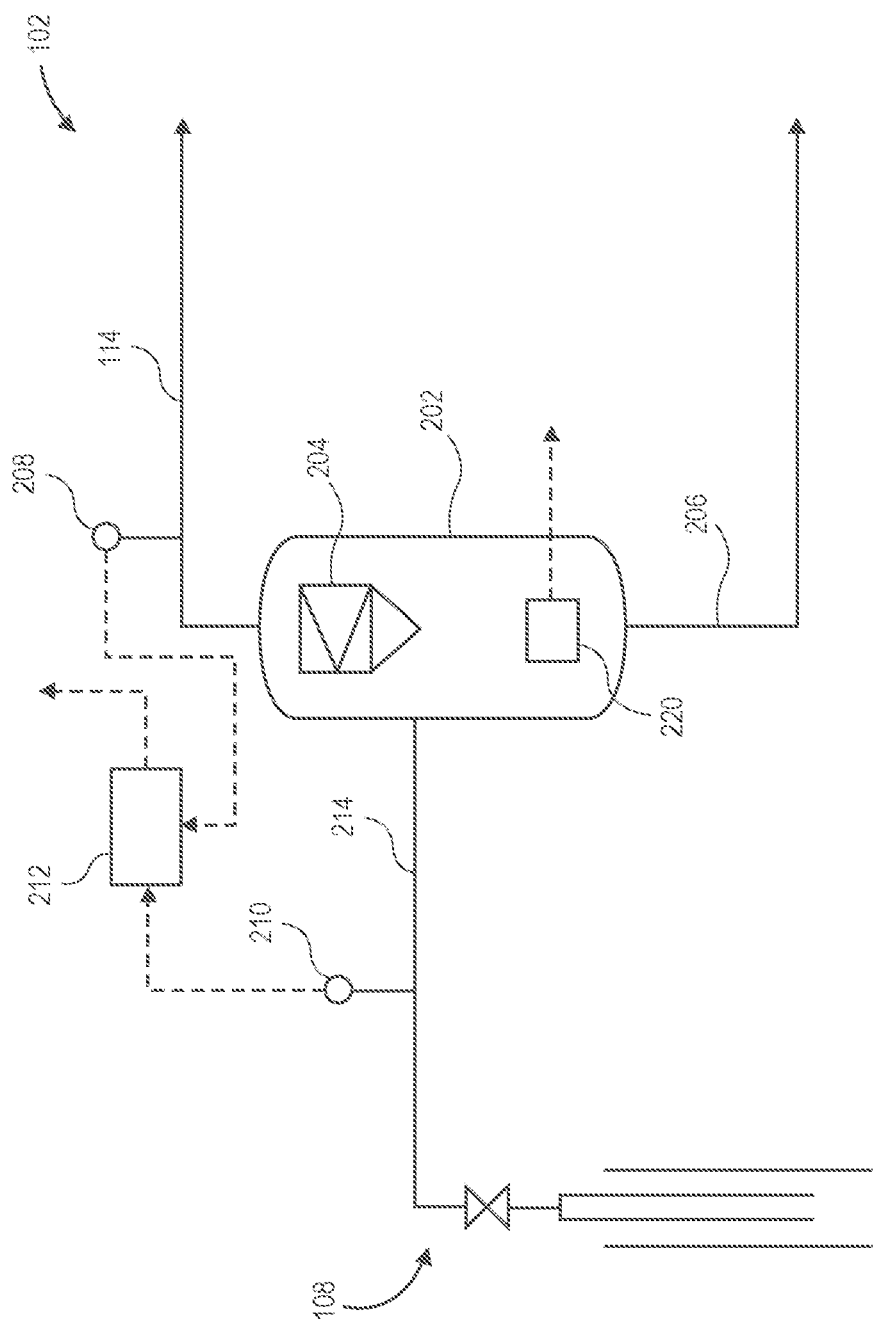
FIG. 2 illustrates a schematic view of a well and a separator of the sand separation system, according to an embodiment.

FIG. 2 illustrates a schematic view of the well 108 and the separator 102 of the system 100, according to an embodiment. The separator 102 may also be representative of at least some embodiments of the separators 104 and 106. As shown, the separator 102 includes a cyclonic separator 204 in combination with a tank 202. In some embodiments, the cyclonic separator 204 may be positioned on top of the tank 202, such that the tank 202 supports the weight of the cyclonic separator 200. The tank 202 may receive and temporarily store solids (e.g., sand) separated from the sand/fluid mixture received at an inlet 214 of the separator 200. The tank 202 may also include a blowdown outlet 206. The blowdown outlet 206 may connect to the blowdown unit 120, as noted above, such that the blowdown unit 120 may be considered "downstream" of the blowdown outlet 206, in the sense that fluid flows toward the blowdown unit 120.

The separator 102 may also include one or more pressure transducers (two shown: 208, 210). These transducers (or others) 208, 210 may be in (e.g., electric) communication with a junction 212. The junction 212, in turn, may be in communication with the central controller 130, e.g., via the blowdown unit 120. That is, in at least one embodiment, the junction 212 may serve as an input for the blowdown unit 120, which may send signals as an input to the central controller 130. In other embodiments, the junction 212 may communicate directly with the controller 130 and/or may communicate only with the blowdown unit 120. The pressure transducer 210 may be positioned at an inlet 214 to the separator 102 and may measure pressure in the mixture of fluid and solids received from the well 108. The pressure transducer 208 may be positioned in the outlet 114 and configured to measure the pressure of the separated fluid received therein. Various other pressure transducers may be employed, e.g., to measure pressure-drop between the inlet 214 and the outlet 206 and/or outlet 114 and/or across chokes or other flow control mechanisms.

In at least one embodiment, the separator 102 may include a load cell 220 configured to produce a signal representative of the weight of the sand separated from the incoming fluid by the cyclonic separator 204. As mentioned above, in at least one embodiment, the load cell 220 may be contained at least partially within the tank 202. For example, a sand hopper may be suspended within the tank 202 via a linkage that includes the load cell 220, such that the load cell 220 is configured to measure a weight of the sand without measuring a weight of the tank 202 or the cyclonic separator 204 (or at least a portion of either/both), thereby potentially increasing an accuracy of the weight measurement. At some point, the increasing weight may indicate that the tank 202 is near capacity or otherwise ready to be blown down. In other embodiments, this load cell 220 may be omitted in view of the measurements taken at the sand disposal unit 126, as described herein.

Figure 3A:
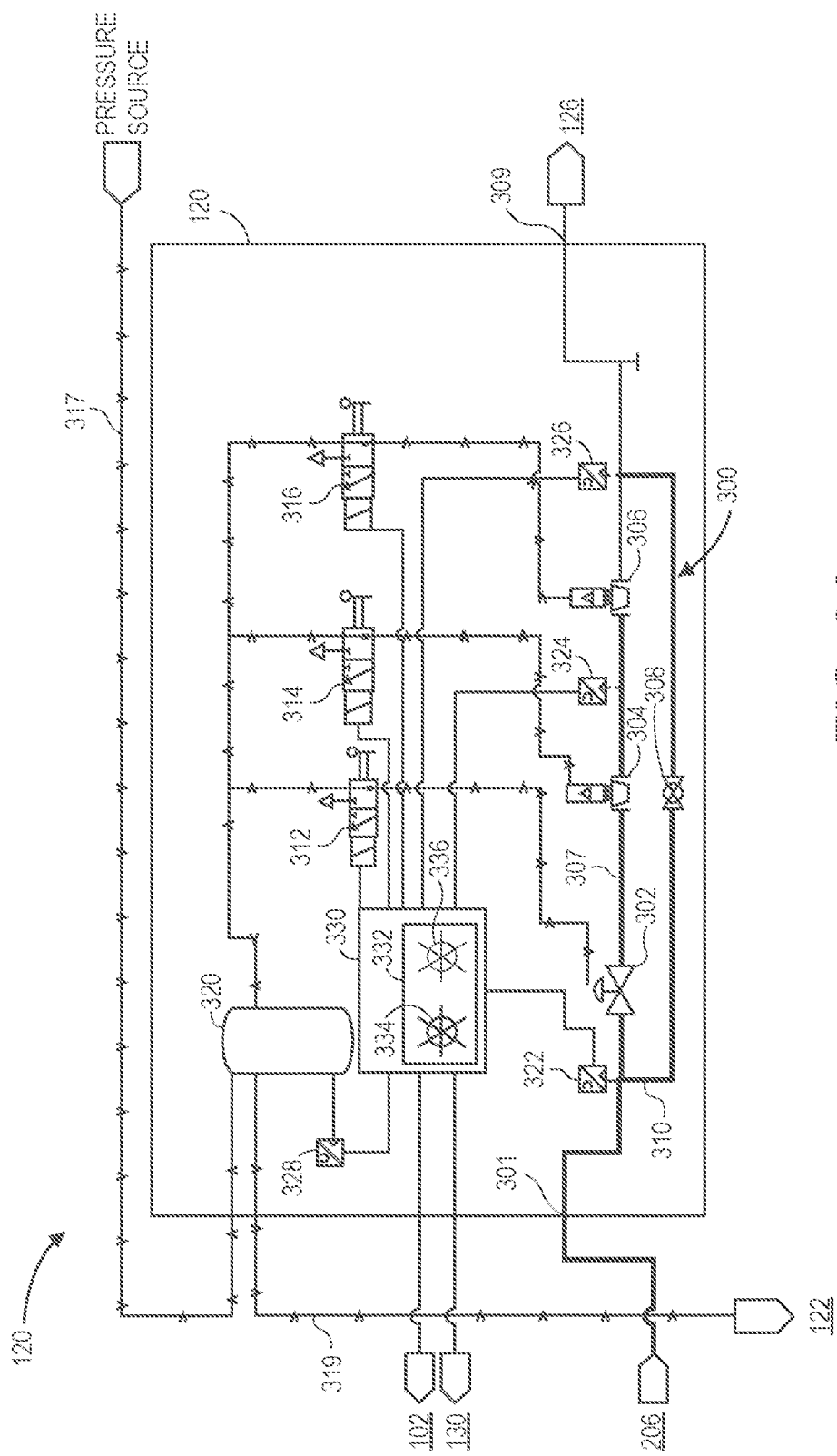
FIG. 3A illustrates a schematic view of a blowdown unit of the sand separation system, according to an embodiment.

FIG. 3A illustrates a schematic view of the blowdown unit 120, according to an embodiment. The blowdown unit 120 embodiment that is illustrated may also be representative of at least one embodiment of the other blowdown units 122, 124. The blowdown unit 120 may include a blowdown valve assembly 300, which may be coupled to the blowdown outlet 206 of the separator 102 via an inlet 301. The blowdown valve assembly 300 may be configured to initiate, control, and terminate the blowdown procedure for the separator 102.

In an embodiment, the blowdown valve assembly 300 may include a shutdown valve 302, a first valve 304, and a second valve 306. The first and second valves 304, 306 may be plug valves, or any other suitable type of valve. The valves 302-306 may be in series, such that fluid flows through the valves 302-306 sequentially, one after the other, e.g., through a blowdown line 307 that extends from the inlet 301 and connects the valves 302-306 together. For example, the shutdown valve 302 may be the first in the series, with the first valve 304 being downstream therefrom, and the second valve 306 being downstream from the first valve 304. Downstream of the second valve 306, the blowdown line 307 may be connected to an outlet 309, which may be connected to the sand disposal unit 126.

In addition, in some embodiments, the blowdown valve assembly 300 may include a bypass valve 308. The bypass valve 308 may be in parallel with the valves 302-306. For example, a bypass line 310 may connect to the blowdown line 307 upstream of the shutdown valve 302, and then again to the blowdown line 307 downstream of the second valve 306.

The valves 302, 304, 306 may be actuated between open positions (permitting fluid flow therethrough) and closed positions (blocking fluid flow therethrough) via respective control valves 312, 314, 316. The control valves 312, 314, 316 are in turn coupled to a control power source, which in this embodiment, is an accumulator 320 that contains a pressurized gas (e.g., air) received via a pressure line 317. The accumulator 320 may also be coupled with a pressure line 319, which may lead to the accumulator of another one of the blowdown units (e.g., unit 122, as shown). In other embodiments, the control power source could be a battery or another source of electric power, a hydraulic power source, or any other suitable source of power.

The control valves 312, 314, 316 are shown in an open configuration, directing pressure from the accumulator 320 to the individual valves 302, 304, 306. In some embodiments, the first and second valves 304, 306 may be biased to their closed positions. Upon application of the pressure from the accumulator 320 via the control valves 314, 316, the first and second valves 304, 306 may be individually actuated (e.g., lifted) to the open position, thereby permitting flow therethrough in the blowdown line 307. Similarly, the shutdown valve 302 may have its closed position as a default and may be opened by application of pressure from the accumulator 320 via the control valve 312. Actuating the control valves 312, 314, 316 to their closed positions may thus relieve pressure from the accumulator 320 to the valves 302-306, which may cause them to close, or at least attempt to close, to block fluid flow through the blowdown line 307. In some embodiments, the bypass valve 308 may be manually operated or operated using a separate control system. The bypass line 310 may thus normally be closed, and may be employed, e.g., in emergency situations.

The blowdown unit 120 may include one or more pressure transducers. For example, pressure transducers 322, 324, 326 may be positioned to measure pressure in the blowdown line 307. For example, the pressure transducer 322 may be configured to measure pressure from the blowdown outlet 206. In some embodiments, this pressure may be higher when the blowdown line 307 is closed (e.g., one or more of the valves 302-304 are closed) as opposed to when at least partially open. Further, the transducer 324 may measure a pressure in the line 307 between the first and second valves 304, 306. When the first valve 304 is closed, the pressure in the line 307 between the first and second valves 304, 306 may be expected to drop, e.g., to ambient or at least to a pressure that is lower than the pressure at the inlet 301. Similarly, the pressure transducer 326 may be positioned downstream of the second valve 306 and may be expected to read ambient or some other relatively low pressure when the first and/or second valves 302, 304 are closed. When the valves 302-306 are open, pressure measured by the transducers 322-326 may be generally equal. In some embodiments, at least the pressure transducer 326 may be replaced or supplemented with a flow meter, so as to detect fluid flow past the second valve 306 and in the outlet 309.

Another pressure transducer 328 may be coupled to the accumulator 320 or elsewhere in the control side of the blowdown unit 120. The pressure transducer 328 may thus be configured to measure the pressure that is available to actuate the valves 302-306.

The blowdown unit 120 may further include a junction box 330. The junction box 330 may be coupled to the pressure transducers 322-328 and configured to receive electrical signals representing the pressures measured by each. Further, the junction box 330 may be coupled to the control valves 312-316 and may be configured to send a control signal thereto, which may cause the control valves 312-316 to actuate between the open and closed positions. Further, the junction box 330 may include or be coupled to a display panel 332. The display panel 332 may include one or more lights 334, 336, alarms, digital display panels, etc., configured to indicate a status (blowdown procedure underway, blowdown procedure ready, warning, etc.).

Figure 3B:
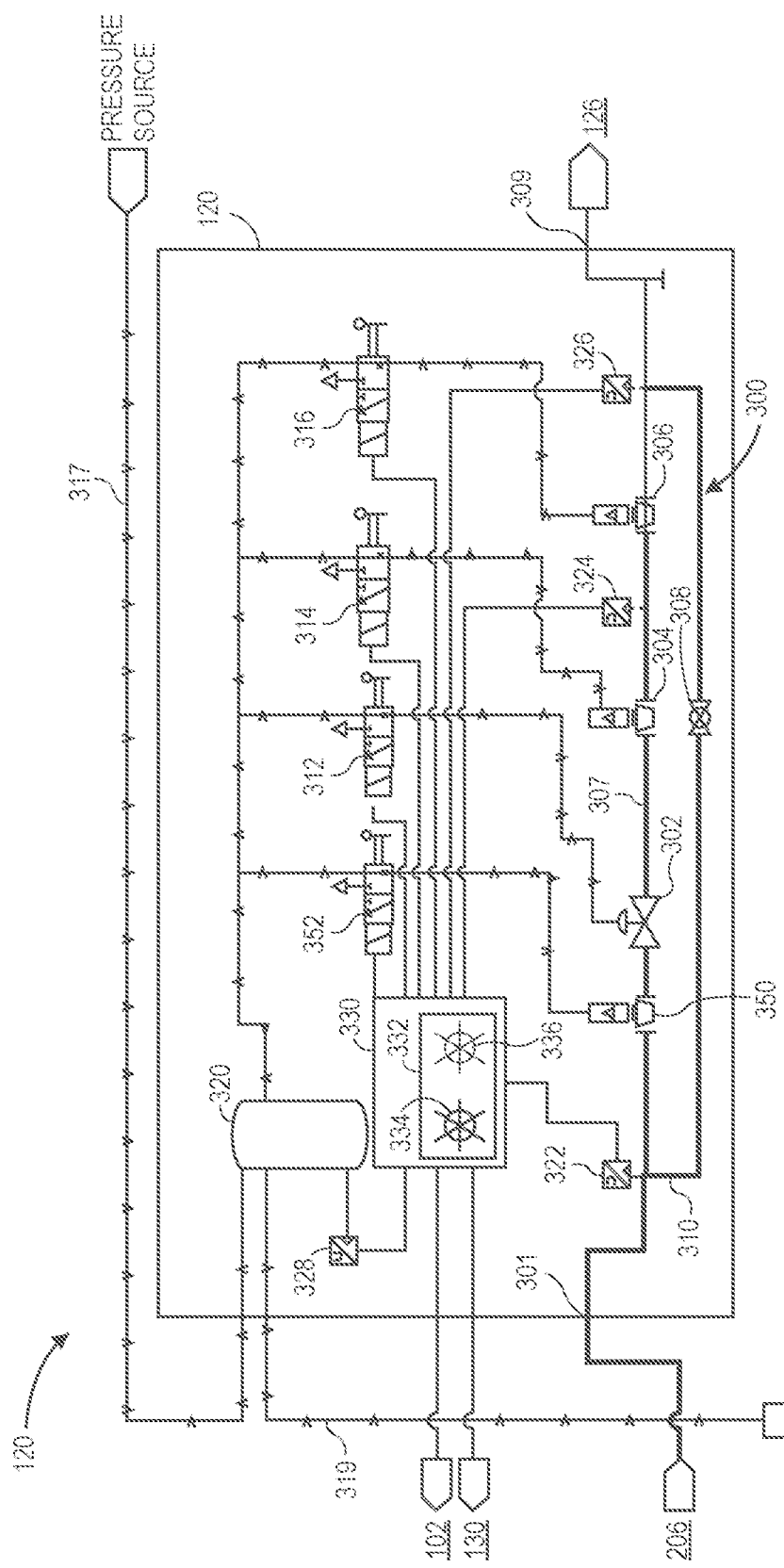
FIG. 3B illustrates a schematic view of another embodiment of the blowdown unit.

FIG. 3B illustrates another embodiment of the blowdown unit 300. In this embodiment, a choke valve 350 may be included to control fluid flow in the line 107. For example, the choke valve 350 may be a cyclonic valve or another type of valve that integrates a choke therein. Such a cyclonic valve may, for example, provide two plates, each with slots or other openings formed therein that may be rotated into or out of alignment. The choke valve 350 may include a variable cross-sectional flowpath area, which may be, at its largest, smaller than the cross-sectional flowpath area of the line 107. As such, even when open, the valve 350 may create a pressure drop in the line 107, which may mitigate or otherwise slow erosion of the valves 302, 304, 306 downstream.

Further, the position of the valve 350 (e.g., open, closed, partially open, or partially closed) may be modulated through the use of a pneumatic control valve 352, which may have two or more positions. In some embodiments, the valve 350 may be the first valve (among valves 350, 304, and 306) to open, and the last of valves 350, 302, 304 to close during normal blowdown operations. As such, the choke valve 350 may experience the highest pressures among the valves 302-306 and 350 of the blowdown valve assembly 300. The choke valve 350 may, in some embodiments, be considered consumable and regularly replaced, and may prevent or at least forestall the other valves 302-306 from similarly being consumed. Alternatively, the valve 350 may be replaced by a fixed-orifice choke, which may likewise induce a pressure drop in the line 107 upstream of the valves 302-306. Further, such an orifice could be placed between or downstream of any/all of the valves 302-306, and embodiments that include multiple orifices are also contemplated herein.

Figure 4:
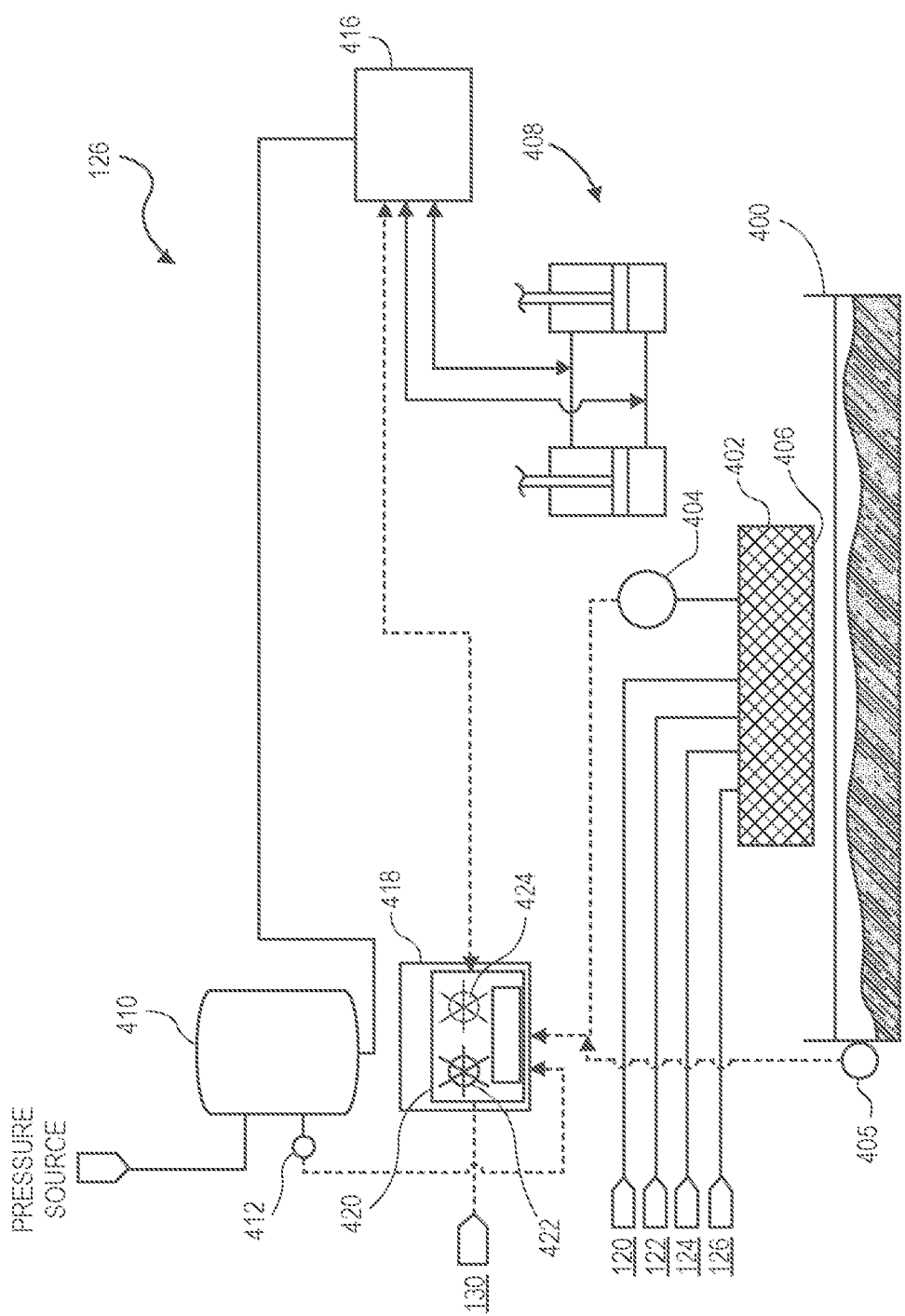
FIG. 4 illustrates a schematic view of a sand disposal unit of the sand separation system, according to an embodiment.

FIG. 4 illustrates a schematic view of the sand disposal unit 126, according to an embodiment. The sand disposal unit 126 may include a disposal container 400, e.g., a tank that may be open to the air and thus at ambient pressure. A basket 402 may be positioned over the container 400 and may be configured to receive sand (and some fluid, e.g., a slurry) from the separators 102-106 via the blowdown units 120-124, as indicated. The basket 402 may include a screen or another type of filter media, such that, when a slurry of sand and fluid is received therein, the fluid drains out of the sand and into the container 400. One or more load cells 404 may be provided to measure a weight of the basket 402, from which the weight of the sand contained therein may be calculated. Further, a level sensor 405 (e.g., a float, viscosity sensor, etc.) may be positioned in the container 400 and configured to measure a level (or at least indicate when the level reaches a certain elevation) of the contents in the container 400.

The basket 402 may include a bottom 406 that is openable via a hydraulic assembly 408 (or any other type of actuator assembly). The hydraulic assembly 408 is shown separate from the basket 402 in this schematic view, but it will be appreciated that the hydraulic assembly 408 may be configured to raise and lower the bottom 406, e.g., pivotally, with respect to a remainder of the basket 402. Thus, the hydraulic assembly 408 may be configured to dump the contents of the basket 402 into the container 400.

In an embodiment, the sand disposal unit 126 may include an accumulator 410, which may be coupled to a source of pressurized gas, e.g., air from a compressor. A pressure transducer 412 may be coupled to the accumulator 410, so as to measure a pressure of the gas contained therein, e.g., to ensure that sufficient pressure is available in the accumulator 410.

An air-over-hydraulic (AOH) system 416 may be provided as part of the sand disposal unit 126. The AOH system 416 may receive pneumatic pressure from the accumulator 410 and may selectively employ the pneumatic pressure to actuate the hydraulic assembly 408 and thereby open and close the bottom 406. Electrical or mechanical hydraulic options are also available for the system 416, and thus an AOH embodiment should be considered merely as an example.

The sand disposal unit 126 may include a junction box 418, which may be in electrical communication with the load cell(s) 404, the level sensor 405, the pressure transducer 412, the AOH system 416, and the central controller 130. The junction box 418 may be operable to receive measurements from the load cell 404, level sensor 405, and the pressure transducer 412, and may transmit these measurements to the central controller 130.

In an embodiment, the level sensor 405 may communicate with the central controller 130 (or any other control system, e.g., a processor on-board the sand disposal unit 126). The level sensor 405 feedback may be used to determine when the tank 400 is nearly full, and shut down blowdowns (and/or shut in the well(s)) to prevent such overfill. The feedback from the level sensor 405 may also serve as a trigger for empty the tank 400. For example, when the level sensor 405 registers that the tank 400 is nearing full (or otherwise reaches a critical level), a vacuum truck may be notified to empty the tank 400. Blowdown and/or other well operations may then recommence. As will be described in greater detail below, the level sensor 405 may also be employed to determine blowdown intervals and/or blowdown duration, potentially in combination with weight measurements from the load cell 404 (and/or 220, FIG. 2).

Further, the junction box 418 may receive commands from the central controller 130. For example, such commands may include opening or closing the bottom 406 of the basket 402. In an embodiment, the junction box 418 may send an electric signal to the AOH system 416, which may actuate one or more valves thereof, causing the AOH system 416 to supply fluid to the hydraulic assembly 408, and thereby open or close the bottom 406.

The junction box 418 may also include a panel 420, including one or more lights (two shown: 422, 424) and a weight indicator. The weight indicator may display a weight, which may be representative of the weight of the sand in the basket 402. The lights 422, 424 may display a status of the sand disposal unit 126, e.g., ready for blowdown, ready for empty, emptying, low pneumatic pressure, warning of malfunction, etc.

Figure 5:
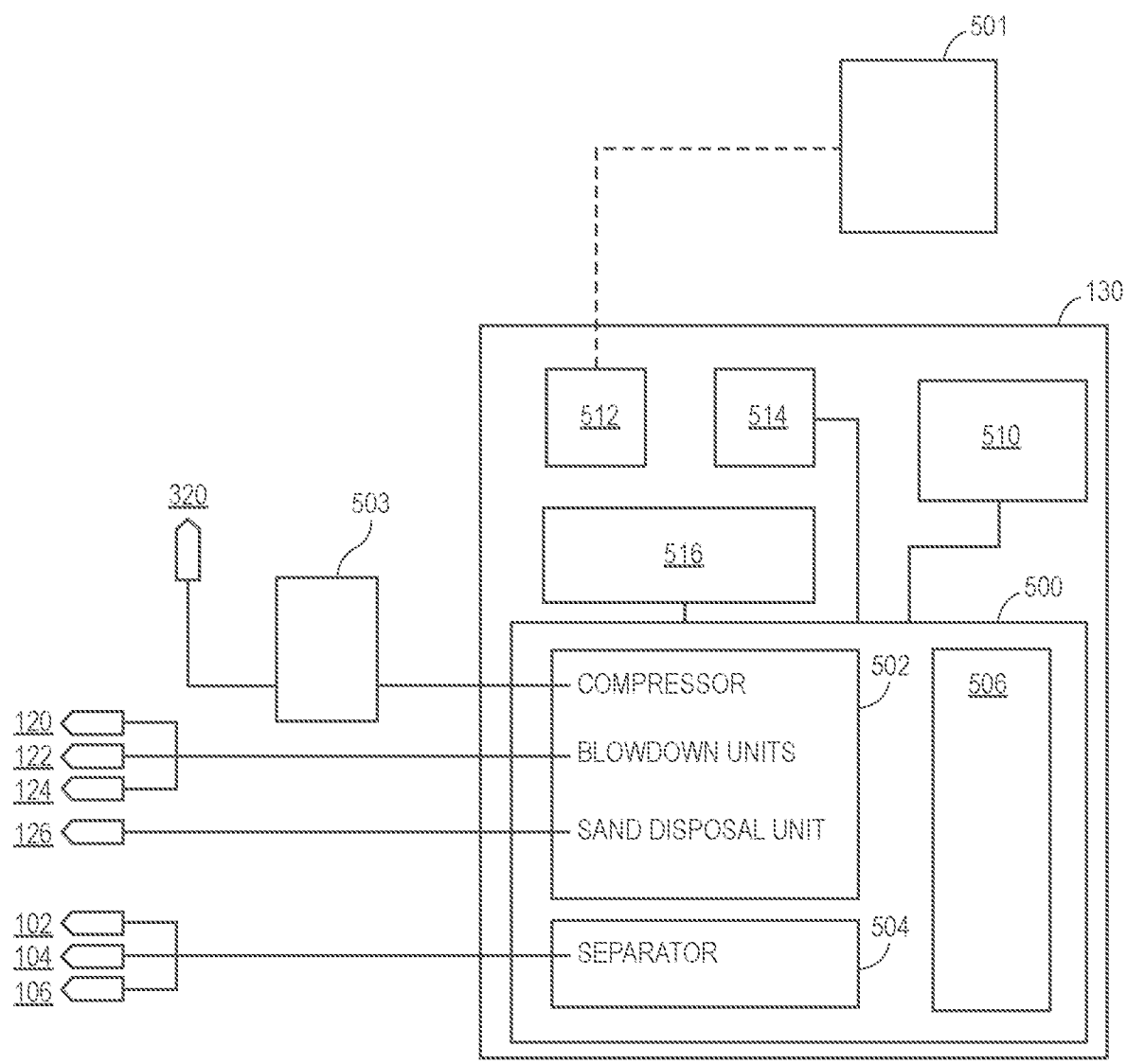
FIG. 5 illustrates a schematic view of a central controller of the sand separation system, according to an embodiment.

FIG. 5 illustrates a schematic view of the central controller 130, according to an embodiment. In addition to the central controller 130, FIG. 5 also shows a light tower 501 and a compressor 503. The compressor 503 may be coupled to any of the accumulators mentioned above and/or act as a source of pressurized fluid (e.g., air) for any other component of the system 100.

The central controller 130 may include a programmable logic controller (PLC) 500, microprocessor, or any other device(s) capable of executing computer-readable instructions and to cause the various components of the system 100 to perform operations. The PLC 500 may in turn include a blowdown control module 502, a separator control module 504, and a human-machine interface 506. The blowdown control module 502 may include connections for the compressor 503, the blowdown units 120-124, and the sand disposal unit 126. These connections may allow for input and output to/from the PLC 500. For example, via the connection with the compressor 503, the PLC 500 may control the speed, pressure, etc. of the compressor 503. Via the connection with the blowdown units 120-124, the PLC 500 may individually control the blowdown units 120-124, causing the blowdown units 120-124 to perform a blowdown process (e.g., independently of one another). The PLC 500 may also be able receive sensor measurements from the blowdown units 120-124, e.g., to determine whether the blowdown units 120-124 (e.g., the blowdown valve assemblies 300 thereof) are operating properly and/or have sufficient pneumatic pressure in the accumulator 320 to actuate the valves 302-306. Moreover, via the connection with the blowdown units 120-124, the PLC 500 may be configured to open/close individual valves 302-306 of the blowdown units 120-124, e.g., using electric signals.

The PLC 500 may also be configured to communicate with the sand disposal unit 126 via the connection therewith. For example, the PLC 500 may receive sensor measurements therefrom, e.g., the weight of the sand in the basket 402 measured by the load cell(s) 404. The PLC 500 may also be configured to send electric signals to the sand disposal unit 126, e.g., so as to cause the bottom 406 to open or close (e.g., via command through the AOH system 416 and the hydraulic assembly 408).

The PLC 500 may be in communication with the separators 102-106 via the separator control module 504. Using this module 504, the PLC 500 may be able to shutdown operation of the separators 102-106, control flow rates, etc., via direct communication with the separators 102-106, individually, e.g., by actuating one or more valves thereof. For example, one or more shutdown valves may be positioned upstream of the individual separators 102-106, and may be closed to shutdown the separator 102-106, and potentially shut-in the well 108-112 to which it is connected. In some embodiments, the PLC 500 may communicate with the load cell 220 in the sensors 102-106 in lieu of or in addition to communicating with the sand disposal unit 126 to determine the amount of sand expelled during a blowdown.

The PLC 500 may be configured to provide output to and receive input from a local user via the HMI 506. For example, the HMI 506 may provide for a manually-initiated blowdown, a manual dump of the basket 402, a read out of the weight of the sand in the basket 402, calibration (e.g., tare) of the load cell(s) 404, blow down, a counter of the number of times blowdown operations have occurred, and plots of the historical blowdown (e.g., sand accumulation) data.

In addition to the PLC 500, the central controller 130 may include hardware and/or software configured to provide a variety of other functions. For example, the central controller 130 may include a modem 510, which may be configured to broadcast signals to a remote system and/or receive signals therefrom. This may allow for remote communication with the controller 130 and remote control thereof. For example, the modem 510 may be in communication with the PLC 500 so as to communicate data signals therewith.

The controller 130 may further include a light-tower controller 512, which is coupled to the light tower 501 and configured to control the lights thereof. The controller 130 may also include a power source 514, which may be coupled to an external source of power (e.g., a generator or municipal grid), and may be configured to convert AC power to (e.g., 12V or 24V) DC power. The controller 130 may further include a panel showing a status of the controller 130 and/or various components of the system 100, e.g., when blowdown is initiated, detection of a malfunction, etc.

The controller 130 may provide a central control system for the system 100, able to pass along commands and receive sensor measurements, e.g., system-wide. Thus, the controller 130 may enforce a prioritization hierarchy of commands or processes in response to a detected status of the system 100. In a specific example, the prioritization hierarchy may be or include the following:

| Priority | Scenario | Description | Action |
|---|---|---|---|
| 1 | High level tank | Sensor 405 indicates maximum tank level reached. | Shutdown valves 302 closed in each of the blowdown units 120-124. Provide notification to operator/vacuum truck provider. |
| 2 | Critical Leak Detected | Transducer 322 measures a pressure above a threshold and transducer 324 registers flow and/or pressure | Shutdown valve 302 closed in affected blowdown unit 120-124. Provide notification to operator. |
| 3 | Minor Leak Detected | Transducer 322 reads pressure below the critical threshold, but above another, lower threshold and/or transducer 324 register flow and/or pressure below critical | Activate leak mitigation routine and issue minor leak detection notification. If cycle counter is exceeded, issue minor leak detected alarm. |
| 4 | Blowdown from sensor trigger or internal scale | Setpoint trigger (e.g., weight of separator) received. | Perform blowdown and activate leak detection logic. If multiple calls for blowdown received, blowdown in the order received. |
| 5 | Scheduled Blowdown | Regularly scheduled blowdown time reached. | Perform when scheduled and activate leak detection logic. |

Figure 6:
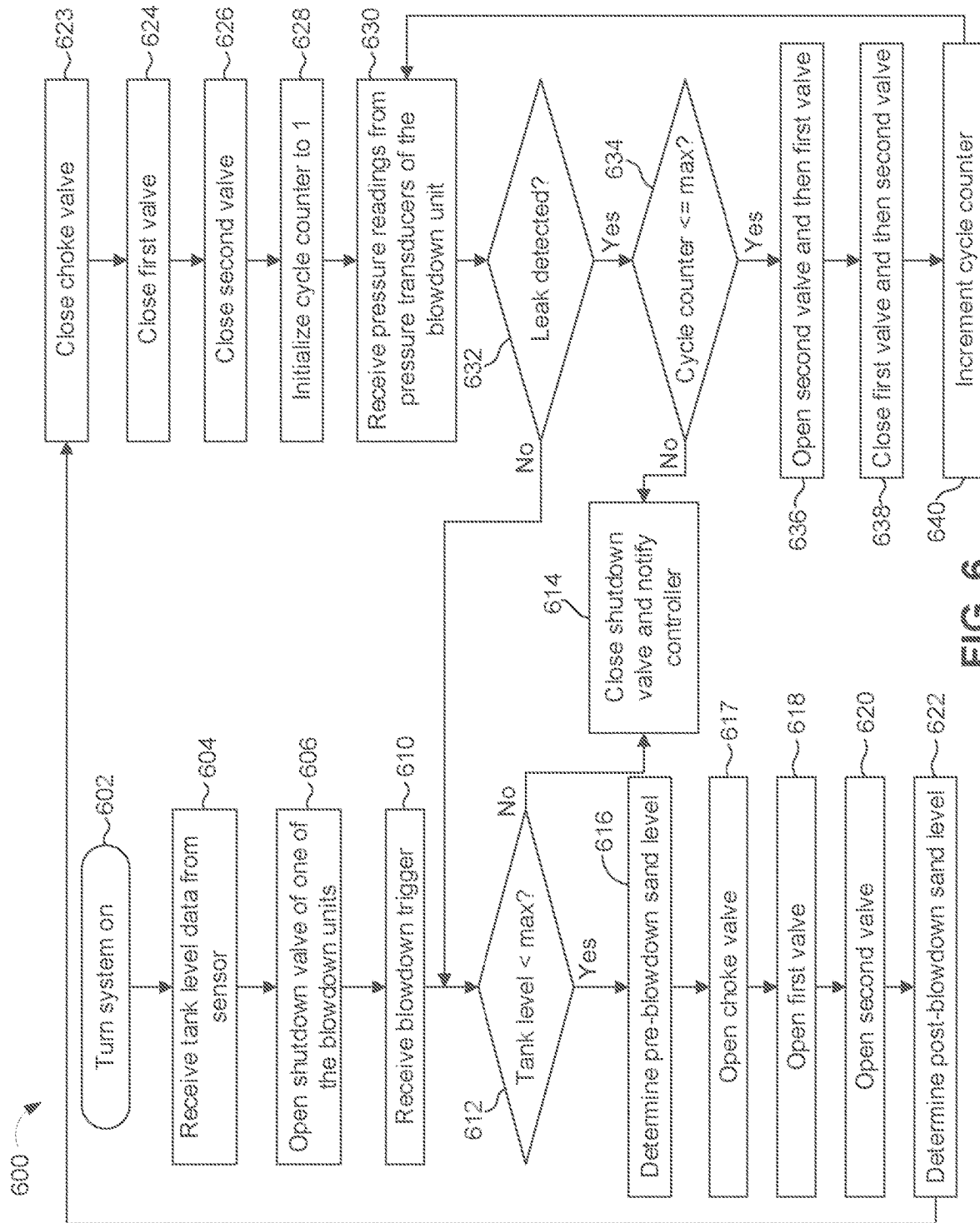
FIG. 6 illustrates a flowchart of a method for blowdown and leak detection/mitigation to assist in automatically controlling a sand separation system, according to an embodiment.

FIG. 6 illustrates a flowchart of a method 600 for blowdown and leak detection/mitigation to assist in automatically controlling a sand separation system, e.g., the sand separation system 100, according to an embodiment. Although a particular order for the steps of the method 600 is described, it will be appreciated that the steps may be executed in a different order and/or steps may be combined or separated.

The method 600 may begin by turning the system on, as at 602. For example, the controller 130 may be energized by closing a relay connect the controller 130 to its power source. Likewise, the blowdown units 120-124 may be powered on, e.g., upon receipt of electrical and/or pneumatic power. The wells 108-112 may also be turned on, e.g., to commence production of fluids therefrom and into the separators 102-106.

The method 600 may then include receive tank level data, e.g. from the sensor 405 regarding the level of sand, water, etc., contained in the container 400, as at 604. Further, the method 600 may include opening the shutdown valve 302 of at least one of the blowdown units 120-124 (e.g., blowdown unit 120), as at 606. At this stage, the first and second valves 304, 306 (and/or the choke valve 350) of the blowdown unit 120 may be or remain closed, thereby preventing blowdown of the corresponding separator 102.

The separator 102 may be operated normally, receiving and separating a mixture of sand or other solids and water or other fluids from a well 108. Eventually, a blowdown trigger may be received, as at 610. The trigger may be based on one or more pressures measured by the transducers 208 and/or 210 (e.g., a differential therebetween) in the separator 102. Additionally or alternatively, the trigger may be the expiration of a timer or reaching a predetermined scheduled time for blowdown of the separator 102.

Prior to initiating blowdown, however, the method 600 may include determining whether the level in the container 400 exceeds a maximum, as at 612, e.g., using the level sensor 405. The maximum may be predetermined or may be dynamic, e.g., varying on how much sand is typically received into the container 400 during a blowdown procedure.

If the container 400 level is at or above its maximum, the shutdown valve 302 may be returned to the closed position, and the controller 130 may be notified, as at 614. The controller 130 may thus take steps to notify rig personnel that the container 400 is full and should be emptied or drained, thereby avoiding unintended overfilling of the container 400. The controller 130 may also, based on this notification, prevent blowdown procedures from being initiated for other separators 102-106 of the system 100.

If the container 400 has capacity (e.g., lower than maximum level), the method 600 may proceed to determining a pre-blowdown sand level, as at 616. This may be determined using the sensor 404 (e.g., load cells attached to the basket 402) and/or the level sensor 405 in the tank 400 but could also or instead be derived by the weight of the separator 102.

The method 600 may then proceed to opening the choke valve 350, as at 617. The method 600 may then proceed to opening the first valve 304, as at 618. After a delay, the second valve 306 may then be opened, as at 620. Accordingly, if the valves 302-306 and 350 are functioning properly, the blowdown unit 120 may thus permit blowdown of the separator 102, such that its contents are emptied into the basket 402 via the blowdown line 307. During or after such blowdown, the sand level may again be determined, as at 622. The differences in the values of sand measured at 616 and 622 may thus be representative of the sand and/or fluids removed from the separator 102 during blowdown.

After a delay sufficient to allow for blowdown of the separator 102 (measured, e.g., from the opening of the second valve 306), i.e., a "blowdown duration", the method 600 may include closing the choke valve 350 (if provided), as at 623 and then the first valve 304, as at 624. After a delay, e.g., to allow closure of the first valve 304, the method 600 may proceed to closing the second valve 306, as at 626.

At this stage, leakage detection and/or mitigation may be initiated. The method 600 may also include initializing a cycle counter, which may count the number of times valve closure is attempted, to one, as at 628. The method 600 may include receiving pressure measurements from one or more of the pressure transducer(s) (e.g., pressure transducer 324) of the blowdown unit 120, as at 630.

The method 600 may then include determining whether a leak in the valve(s) 304, 306 is apparent, as at 632. For example, if the pressure measurement received from the pressure transducer 324, between the first and second valves 304, 306 is higher than ambient, it may indicate that the first valve 304 is leaking. The second valve 306 may be provided, partially as a redundancy, to prevent unintended blowdown of the separator 102. As such, fluid leaking through the first valve 304 may tend to equalize the pressure between the pressure transducer 322 upstream of the first valve 304 and the pressure measured by the pressure transducer 324 downstream of the first valve 304. If the valve 304 is not leaking, the pressures measured by the pressure transducer 324 and the pressure transducer 326 may be approximately equal. If both the first and second valves 304, 306 are leaking, the pressure transducer 326 may read a pressure value approximately equal to that measured by the pressure transducer 322.

In some embodiments, pressure may be injected between the first and second valves 304, 306 to facilitate leak detection. For example, low-flow meters, which may be employed as the sensor 324 downstream of the second valve 306, may not be entirely reliable. Accordingly, a fluid or gas may be injected into the line 307 between the first and second valves 304, 306 when the first and second valves 304, 306 are closed. The pressure may be measured using the pressure transducer 322. If the pressure reduces over time, without opening the first and second valves 304, 306, it may be evidence of a leak in either or both of the valves 304, 306.

If, based on the pressure measurements, the controller 130 determines that leakage is not occurring at 632, no leak mitigation may be called for, and the method 600 may return to awaiting the next blowdown trigger at 610. Otherwise, the method 600 may enter the leak mitigation phase. In this phase, the method 600 may check whether the cycle counter, which was initialized to one in block 628, is less than or equal to a maximum (e.g., two), as at 634. If the cycle counter is less than or equal to the maximum, the method 600 may attempt to wash out the first and/or second valves 304, 306, e.g., in case leakage is occurring because the valve(s) 304, 306 are being prevented from closing fully by sand. Accordingly, for example, the method 600 may include opening the second valve 306 and then opening the first valve 304, as at 636. The method 600 may then include closing the first valve 304 and then closing the second valve 306, as at 638. The method 600 may then proceed to incrementing the cycle counter, as at 640.

The method 600 may then receive the pressure measurements again at 630, and again determine whether a leak is detected at 632, based on these pressure measurements. If a leak is still indicated, the method 600 may determine if the number of leak mitigation cycles, as recorded by the cycle counter, remains less than the maximum at 634. If it is, another round of wash out attempts occurs at 636, 638. This process of washing out and determining if a leak is apparent may repeat for as many times as the counter allows. When the counter exceeds the maximum, the method 600 may determine that the first valve 304 and/or the second valve 306 is/are damaged, and may thus close the shutdown valve 302 and notify the controller 130, as at 614.

Further, when a leak is detected, the method 600 may include tolling blowdown of other separators (in this case, the separators 104 and 106). This may permit the leak mitigation process to proceed without interfering with the sand quantification for (or other aspects of) blowdown of the other separators 104, 106. For example, if leak mitigation is being performed for one separator 102 during a regularly scheduled blowdown for another separator 104, the blowdown of the separator 104 may be postponed. However, there may be a maximum tolling for blowdown of the other separator 104, so as to avoid flooding the separator 104. Thus, if leak mitigation for the separator 102 blowdown takes too long, it may be stopped to allow for blowdown of the other separator 104. Similarly, as noted above, sensor-initiated blowdowns may be queued if multiple are received in a short time period, so that blowdown of two separators does not occur simultaneously, in at least some embodiments.

The foregoing describes detecting leakage in the valves 302-306 of the blowdown valve assemblies 300 of the individual blowdown units 300. However, the method 600 may also include a redundancy measure which may enable checking for system-wide leakage. In particular, the method 600 may include monitoring the sand level in the tank 400 measured by the level sensor 400 and/or the sand weight in the basket 402 measured by the load cell 404. If either or both of these measurements increase, indicating that sand and/or fluid is being received into the sand disposal unit 126, when none of the blowdown units 120-124 have been signaled to blowdown the separators 102-106, it may be inferred that one or more of the blowdown units 120-124 is permitting leakage. In response, the method 600 may implement the leak mitigation phase, as discussed above, for each of the blowdown units 120-124, further investigate the source of the leakage, shut down the system 100, call for maintenance, or otherwise take actions to avert any potential overfilling of the tank 400.

Figure 7:
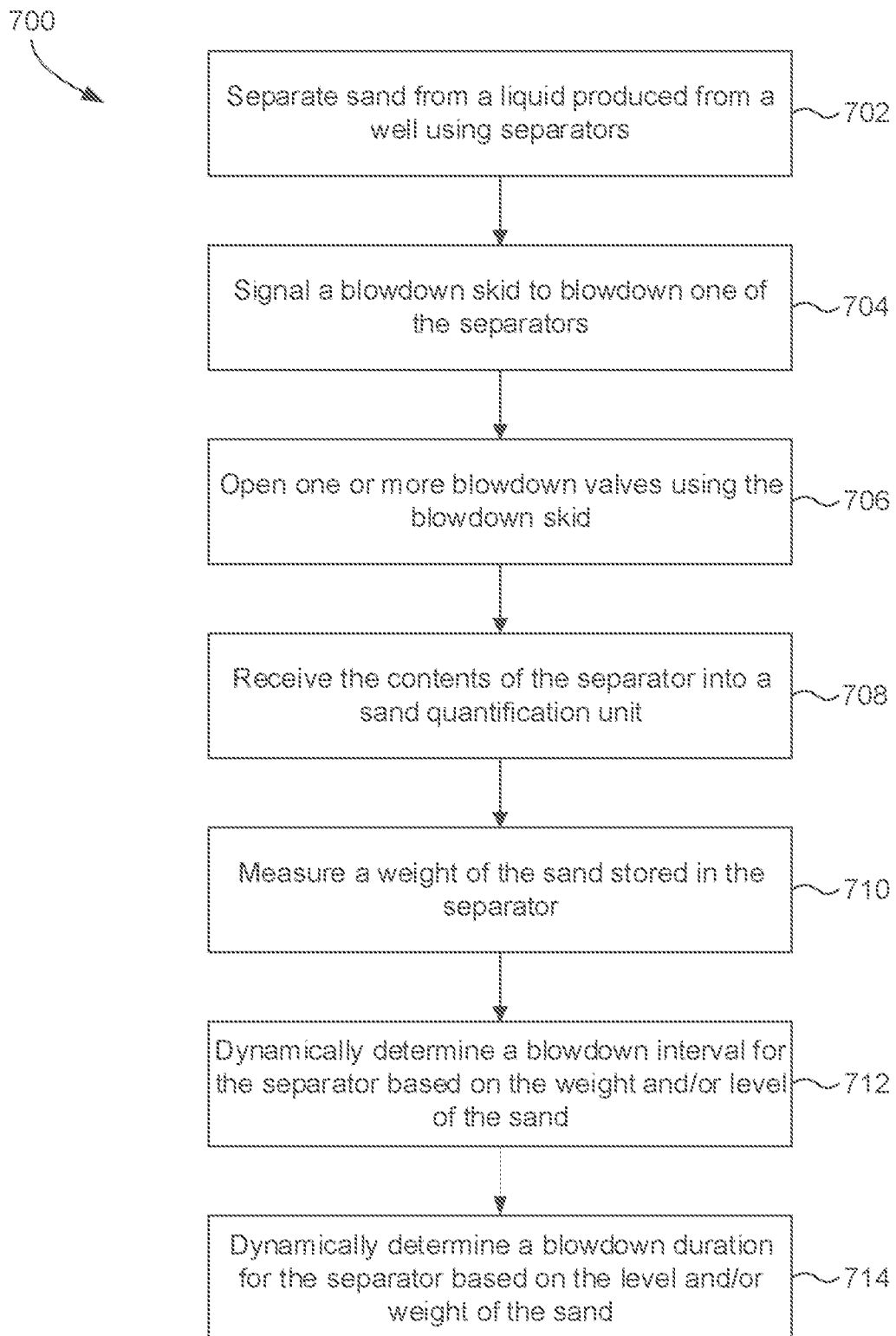
FIG. 7 illustrates a flowchart of a method for automatically controlling a sand separation system, according to an embodiment

FIG. 7 illustrates a flowchart of a method 700 for automatically controlling a sand separation system, e.g., the sand separation system 100, according to an embodiment. Although a particular order for the steps of the method 700 is described, it will be appreciated that the steps may be executed in a different order and/or steps may be combined or separated.

The method 700 may include separating sand from a fluid produced from a well 108-112 using a plurality of separators 102-106, as at 702. The separators 102-106 may temporarily store the sand therein and provide the separated fluid to a production separator. The method 700 may also include signaling, from a controller 130 to a blowdown unit 120, to blowdown one of the separators (e.g., the separator 102), as at 704. This may be conducted automatically, e.g., at scheduled times or at intervals between blowdowns. In some embodiments, the blowdown may be conducted in response to a sensor-based trigger, e.g., a weight of the separator 102 reaching a particular threshold that indicates it is reaching its sand-storage capacity.

The method 700 may include opening one or more blowdown valves (e.g., the valves 302-306) coupled to a blowdown outlet 206 of the separator 102 using the blowdown unit 120 in response to the signaling, as at 706.

The method 700 may then include receiving the stored contents from the separator 102 into a sand disposal unit 126, as at 708. The method 700 may further include measuring a weight of the sand stored in the separator 102, e.g., as represented by a weight of the sand evacuated therefrom during a blowdown and received into the sand disposal unit 126 or directly by measurement from the load cell 220 positioned in the separator 102. For example, the sand disposal unit 126 may include a basket 402 that receives the fluid from the separators 102-106, and filters the sand therefrom, allowing the fluids to drain into the tank 400. The weight of the basket 402 can then be measured, which provides an indication of how much sand was received during a blowdown procedure.

The method 700 may also include dynamically determining a blowdown interval for subsequent blowdown operations of one or more of the separators 102-106 based in part on the weight of the sand, as at 712. Thus, if sand is being produced from the well 108 more quickly than in previous intervals, the blowdown interval for the separator 102 may be reduced, so as to avoid overfilling the separator 102. On the other hand, if sand is being produced from the well 108 more slowly than in previous intervals, the blowdown interval for the separator 102 may be increased, so as to avoid unnecessary wear of the valves and other components of the separator 102 and/or blowdown unit 120. In other words, the time between blowdowns may be maximized up to a point, so as to avoid filling the separator 102 fully with sand which may carryover between blowdowns, while avoiding blowing down more frequently than necessary.

The method 700 may additionally include dynamically determining a blowdown duration for one or more of the separators 102-106 based in part on the weight and/or level of the sand, as at 714. As noted above, "blowdown duration" refers to the amount of time the blowdown line 107 is open in a given blowdown unit 120-124, e.g., with the valves 302, 304, 306 (and 350, if included) open and prior to closing one or more of the valves 302-306 (and 350). For example, if blowdown operations reveal large amounts of sand being introduced to the tank 400 of the sand disposal unit 126, then the blowdown duration may be lengthened (e.g., holding the valves 302-306/350 open longer) so as to more fully clear the separators 102-106 of sand. If sand amount decreases, blowdown duration may be shortened, e.g., to prevent a well from "gasing out" by emptying the separator 102-106 and blowing mostly gas out the blowdown line 107. If consistent readings come in, a test may be performed to ensure the blowdown duration is sufficient, e.g., by performing a longer than normal blowdown and determining if additional sand, and how much, is received in the sand disposal unit 126. If the sand produced during the test is larger than was received in previous blowdown operations, or received at a relatively consistent rate throughout the blowdown duration, it may indicate that a longer blowdown duration is called for. Further, it will be appreciated that the different separators 102-106 may call for different blowdown durations, as the wells to which they are connected may produce sand at different rates.

In some embodiments, the method 700 may provide leak detection and/or mitigation. For example, the method 700 may include receiving a feedback (e.g., electrical) signal from the blowdown unit 120 that represents that one or more valves 302-306 of the blowdown unit are malfunctioning (e.g., leaking). For example, the signal may be generated by a pressure and/or flow sensor, or two or more sensors in combination. In response to receiving the feedback signal, one or more scheduled blowdown operations for other separators 104-106 may be tolled (e.g., delayed). The leak mitigation efforts may then include attempting to correct operation of the one or more valves 302-306 while the one or more scheduled blowdown operations are tolled.

In an embodiment, the method 700 may include determining that a maximum tolling time has been reached for the one or more scheduled blowdown operations, and in response to determining that the maximum tolling time has been reached, shutting down the separators 102. This may prevent the other separators 104, 106 from overfilling by delaying blowdown thereof too long.

In some embodiments, to detect leakage, rather than (or in addition to) relying on sensor readings related to fluid evacuating as part of the blowdown from the separator 102, the method 700 may include injecting a pressurized fluid between the first and second valves 304, 306 when the first and second valves 304, 306 are closed. The feedback signal may thus be representative of the pressure between the first and second valves 304, 306. As the first and second valves 304, 306 being closed should retain the pressure until one or other are opened, the feedback signal represents that at least one of the first valve 304 or the second valve 306 is malfunctioning when the feedback signal represents a pressure that lowers over time.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An automated sand separator discharge system, comprising:
a sand separator disposed downstream of a wellhead;
an inlet conduit for transporting a process stream from the wellhead to the sand separator;
a fluid outlet conduit for transporting a liquid and gas stream from the sand separator to further downstream processing;
a sand discharge conduit for removing sand from the sand separator;
a first valve and a second valve, the first and second valves disposed along the sand discharge conduit, the first valve being upstream of the second valve;
a choke valve positioned along the sand discharge conduit;
a first transducer connected to the sand discharge conduit between the first and second valves and operative to measure pressure in a portion of the sand discharge conduit that is between the first and second valves and produce a pressure reading indicating the measured pressure; and
a control panel operatively connected to the first, second, and choke valves and the first transducer, the control panel being programmed to initiate and terminate discharge of sand from the sand separator, wherein the control panel is configured to open the second valve only when the first valve is closed, to open the first valve only when the second valve is open, to close the second valve only when the first valve is closed, and to close the first valve only when the second valve is open, whereby the second valve only actuates while the first valve is closed so as to prevent the second valve from eroding, the control panel also being programmed to periodically perform seal integrity checks of the first and second valves to determine if the first and second valves are sealing completely when closed based at least in part on a measurement of the first transducer, wherein the second valve is configured to be opened and closed a plurality of times in response to determining that the second valve is not sealing completely, until reaching a maximum cycle count or until there is a determination that the second valve is sealing completely based at least in part on a reading from the first transducer.

2. The system of claim 1, further comprising a second transducer operative to measure pressure in the inlet conduit upstream of the sand separator and produce a pressure reading indicating the pressure measured by the second transducer, the second transducer being operatively connected to the control panel.

3. The system of claim 2, further comprising a third transducer operative to measure pressure in the fluid outlet conduit downstream of the sand separator and produce a pressure reading indicating the pressure measured by the third transducer, the third transducer being operatively connected to the control panel.

4. The system of claim 1, wherein the control panel initiates the discharge of sand from the sand separator in response to a signal from one of a timer, a clock, or a sand level sensor.

5. The system of claim 1, further comprising an emergency shutdown valve positioned upstream of the first and second valves that, in a closed position, prevents fluid flow to the first and second valves from the sand separator.

6. The system of claim 5, further comprising a second pressure transducer positioned upstream of the emergency shutdown valve and downstream of the sand separator, wherein the control panel is programmed to actuate the emergency shutdown valve to the closed position in response to a pressure reading of the second pressure transducer being higher than a predetermined value.

7. An automated sand separator discharge system, comprising:
a sand separator disposed downstream of a wellhead;
an inlet conduit for transporting a process stream from the wellhead to the sand separator;
a fluid outlet conduit for transporting a liquid and gas stream from the sand separator to further downstream processing;
a sand discharge conduit for removing sand from the sand separator;
a first valve and a second valve, the first and second valves disposed along the sand discharge conduit, the first valve being upstream of the second valve;
a choke valve positioned along the sand discharge conduit;
a first transducer connected to the sand discharge conduit between the first and second valves and operative to measure pressure in a portion of the sand discharge conduit that is between the first and second valves and produce a pressure reading indicating the measured pressure; and
a control panel operatively connected to the first, second, and choke valves and the first transducer, the control panel being programmed to initiate and terminate discharge of sand from the sand separator, wherein the control panel is configured to open the second valve only when the first valve is closed, to open the first valve only when the second valve is open, to close the second valve only when the first valve is closed, and to close the first valve only when the second valve is open, whereby the second valve only actuates while the first valve is closed so as to prevent the second valve from eroding,
the control panel also being programmed to periodically perform seal integrity checks of the first and second valves to determine if the first and second valves are sealing completely when closed, wherein:
the control panel is programmed to verify seal integrity of the first valve by venting the space between the first and second valves to atmosphere, then sealing the space and monitoring the pressure reading of the first transducer for an increase in pressure; and
the control panel is programmed to verify seal integrity of the second valve by pressurizing the space between the first and second valves, and monitoring the pressure reading of the first transducer for any decrease in pressure, and
wherein the second valve is configured to be cycled open and closed a plurality of times until reaching a maximum cycle count or until the control panel determines that the second valve is sealing closed based at least in part on a reading from the first transducer.

8. The system of claim 1, wherein the control panel is programmed to perform the seal integrity checks after a specified number of sand discharge sequences or after a specified amount of time.

9. The system of claim 1, further comprising:
a fourth transducer connected to the wellhead, operative to measure pressure from the wellhead and produce a pressure reading indicating the measured pressure;
an emergency shutdown valve; and
the control panel operative to trigger the emergency shutdown valve if the pressure reading of the fourth transducer is outside of predetermined specifications.

10. The system of claim 1, further comprising:
a second control panel in communication with the control panel, the second control panel operative to receive a signal from the control panel and trigger an emergency shutdown valve if pressure reading of the first transducer is outside of predetermined specifications.

11. A method of discharging sand from a sand separator, comprising:
providing a sand separator discharge system, comprising:
a sand separator disposed downstream of a wellhead;
an inlet conduit for transporting a process stream from the wellhead to the sand separator;
a fluid outlet conduit for transporting a liquid and gas stream from the sand separator to further downstream processing;
a sand discharge conduit for removing sand from the sand separator;
a first valve and a second valve, the first and second valves being disposed along the sand discharge conduit, the second valve being downstream of the first valve;
a choke valve positioned along the sand discharge conduit;
a first transducer connected to the sand discharge conduit between the first and second valves and operative to measure pressure in the portion of the sand discharge conduit which is between the first and second valves and produce a pressure reading indicating the measured pressure;
a control panel operatively connected to the first, second, and third valves and the first transducer, whereby the control panel is operative to initiate the discharge of sand from the sand separator;
through the use of the control panel, initiating discharge of sand from the sand separator and performing the following:

open the first valve;
open the second valve;
open the choke valve; and
through the use of the control panel, terminating discharge of sand from the sand separator and performing the following:
close the choke valve;
close the second valve; and
close the first valve,
wherein the first valve is opened only while the choke valve is closed, the first valve is closed only while the choke valve is closed, the second valve is opened only while the first valve is closed, and the second valve is closed only when the first valve is closed;
initiating a seal integrity check of the first and second valves based on a measurement of the first transducer;
determining that the second valve is not sealing completely based at least in part on a subsequent measurement of the first transducer; and
cycling the second valve open and closed a plurality of times.

12. The method of claim 11, wherein initiating the seal integrity check of the first and second valves, comprises:
verifying seal integrity of the first valve by venting the space between the first and second valves to atmosphere, then sealing the space and monitoring the pressure reading of the first transducer for any increase in pressure; and
verifying seal integrity of the second valve by pressurizing the space between the first and second valves, and monitoring the pressure reading of the first transducer for any decrease in pressure.

13. The method of claim 11, system further comprises an emergency shutdown valve operatively connected to the control panel, the third valve being configured to be actuated into a closed position so as to prevent fluid flow from the sand separator to the first and second valves.

14. The method of claim 11, wherein the discharge of sand is terminated after a predetermined period of time.

15. The method of claim 14, wherein the control panel is configured to determine the predetermined period of time between initiating and terminating the discharge of based at least in part on a sensor configured to measure an amount of sand separated by the sand separator.

16. The method of claim 11, further comprising closing an emergency shutdown valve positioned downstream of a well and upstream of the sand separator in response to a pressure reading being above a predetermined threshold.

17. A sand separator system, comprising:
a sand separator coupled to a well and configured to receive sand and fluid therefrom, the sand separator being configured to separate at least some of the sand from the fluid;
a sand discharge conduit coupled to the sand separator and configured to receive the sand separated from the fluid in the sand separator;
a first valve and a second valve that are coupled to the sand discharge conduit in series, the second valve being downstream of the first valve;
a choke valve coupled to the sand discharge conduit in series with the first and second valves;
a pressure sensor configured to measure a pressure in the sand discharge conduit between the first valve and the second valve, so as to determine when a leak in the first valve, the second valve, or both is occurring;
a control panel coupled to the first valve, the second valve, and the pressure sensor, wherein the control panel is configured to actuate the first and second valves each between an open position and a closed position, and wherein the control panel is configured to detect integrity of the first and second valves based in part on the pressure measured by the pressure sensor, wherein the control panel is configured to open the second valve only when the first valve is closed, to open the first valve only when the second valve is open, to close the second valve only when the first valve is closed, and to close the first valve only when the second valve is open, whereby the second valve only actuates while the first valve is closed so as to prevent the second valve from eroding, the control panel also being programmed to periodically perform seal integrity checks of the first and second valves to determine if the first and second valves are sealing completely when closed based at least in part on a measurement of the first sensor,
wherein the second valve is configured to be cycled open and closed a plurality of times in response to a determination that the second valve is not sealing completely, until reaching a maximum cycle count or until the second valve is determined to be sealing completely based at least in part on a reading from the first sensor; and
a shutdown valve coupled to the sand discharge conduit and positioned upstream of the first valve and connected downstream of the second valve, the control panel being configured to close the shutdown valve so as to prevent fluid flow between the sand separator and the first valve at least partially in response to the pressure measured by the pressure sensor being above a predetermined threshold.

18. The sand separator system of claim 17, further comprising a choke valve coupled to the sand discharge conduit and positioned upstream of the shutdown valve, the choke valve being configured to reduce a pressure at the first valve prior to actuating the first valve.

19. The sand separator system of claim 17, further comprising:
a sand disposal unit coupled to the sand discharge conduit and configured to receive sand therefrom; and
a sand sensor coupled to the sand disposal unit and configured to measure an amount of sand received in the sand discharge conduit during a blowdown operation, the control panel being configured to determine a blowdown interval for a subsequent blowdown operation based at least in part on the amount of sand received from the sand discharge conduit during the blowdown operation.

20. The sand separator system of claim 19, wherein the sand sensor comprises a load cell configured to measure a weight of the sand received from the sand discharge conduit during a blowdown.

21. The sand separator system of claim 17, wherein the control panel is configured to only cause the second valve to open when the first valve is closed, and to only cause the second valve to close when the first valve is closed.

22. The system of claim 1, wherein the control panel is programmed to periodically perform seal integrity checks of the first and second valves to determine if the first and second valves are sealing completely when closed, and wherein the control panel is configured to detect a leak in the first and/or second valve based on the first transducer measuring a pressure that is above a threshold after the first and second valves are closed.

23. The system of claim 3, wherein the third transducer is positioned downstream of the second valve and downstream of the first transducer, and wherein the control panel is configured to detect a leak in both of the first and second valves in response to the first and second transducers measuring substantially equal pressures.

24. The system of claim 3, wherein the third transducer is positioned upstream of the first valve and upstream of the first transducer, and wherein the control panel is configured to detect a leak in at least the first valve in response to the first and second transducers measuring substantially equal pressures.

25. The sand separator of claim 19, wherein the sand sensor is configured to measure a weight of the sand while the first and second valves are closed, and wherein the control panel is configured to detect a leak in response to the weight measured by the sand sensor increasing while the first and second valves are closed.

26. The sand separator of claim 25, wherein at least some fluid is drained from the sand in the sand disposal unit, such that, after the fluid is drained, the sand sensor weighs the sand but not the fluid drained therefrom.

27. The system of claim 1, further comprising a bypass valve disposed in parallel with the first, second, and choke valves, such that fluid flow bypasses the first, second, and choke valves when the bypass valve is open, the control panel operative to open the bypass valve in response to the pressure reading of the first transducer being outside of one or more predetermined specifications.

28. The system of claim 1, wherein the choke valve provides a reduced flowpath area in the sand discharge conduit in an open position, and is actuatable to a closed position that stops fluid flow in the sand discharge conduit.

29. The system of claim 1, wherein the first valve, the second valve, and the choke valve are directly connected together via the sand discharge conduit such that there are no other valves therebetween.

30. The system of claim 1, wherein:
the control panel is configured to determine that the second valve is not sealing completely as part of at least one of the seal integrity checks;
the control panel is configured to cause the second valve to be opened and closed the plurality of times in response to determining that the second valve is not sealing completely; and
the control panel is configured to determine that the plurality of times reaches the maximum cycle count or that the second valve is sealing completely, and to stop cycling the second valve in response thereto.

* * * * *